Nov. 22, 1949     B. E. BALDUF     2,489,171
SPREADER
Filed Oct. 31, 1945     2 Sheets-Sheet 1

INVENTOR
B. E. BALDUF
BY
ATTORNEY

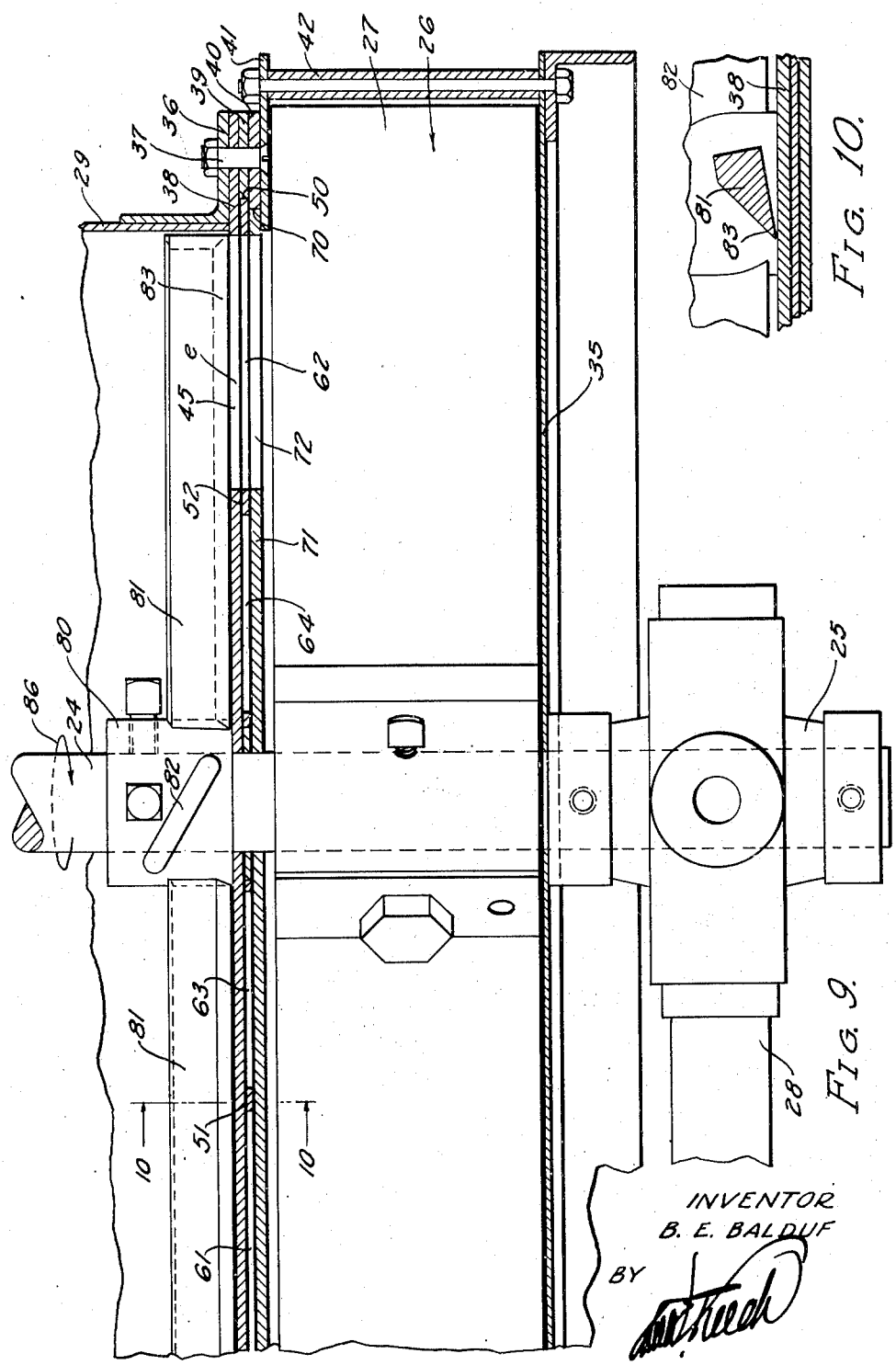

Patented Nov. 22, 1949

2,489,171

UNITED STATES PATENT OFFICE 2,489,171

SPREADER

Bruno E. Balduf, Rockford, Ill., assignor to Food Machinery and Chemical Corporation, a corporation of Delaware Application October 31, 1945, Serial No. 625,723

3 Claims. (Cl. 275—8)

This invention relates to agricultural machinery and particularly to devices for spreading seed, fertilizer, and fine material of various kinds over fields, lawns, golf courses and the like.

It is a principal object of this invention to provide a novel spreader in which the area over which the material is spread may be readily controlled.

It is an other object of the invention to provide a spreader having a volume control and a direction control and in which manipulation of the direction control does not modify the setting of the volume control.

It is a still further object of the invention to provide a spreader having a volume control and a direction control in which the latter may be operated to optionally direct material principally to the right of the fore-and-aft axis of the spreader, principally to the left of said axis, or uniformly on both sides of said axis without effecting a change in said volume control.

The manner of accomplishing the foregoing objects, as well as further objects and advantages, will be made manifest in the following description taken in connection with the accompanying drawings, in which:

Fig. 1 is a diagrammatic side elevational view of a preferred embodiment of the spreader of my Fig. 1 is a diagrammatic side elevational view of a preferred embodiment of the spreader of my invention attached to the rear end of a truck carrying the material to be spread.

Fig. 2 is a rear elevational view of Fig. 1.

Fig. 3 is a plan view of Fig. 2 and illustrates the discharge of material to the right side of the fore-and-aft axis of the spreader.

Fig. 4 is a diagrammatic group of three views illustrating the volume control disc of the invention, the direction control valves thereof, and the hopper floor plate of the invention as positioned when the spreader is operating as shown in Fig. 3.

Fig. 5 is a view similar to Fig. 3 and showing the spreader of my invention distributing material to the left side of the fore-and-aft axis thereof.

Fig. 6 is a view similar to Fig. 4 and showing the same parts positioned as when the spreader is operating as shown in Fig. 5.

Fig. 7 is a view similar to Fig. 5 and showing the spreader of my invention distributing material equally on both sides of the fore-and-aft axis of the spreader.

Fig. 8 is a view similar to Fig. 6 and showing the same parts positioned as when the spreader is operating as shown in Fig. 7.

Fig. 9 is an enlarged fragmentary cross sectional view taken on the line 9—9 of Fig. 6.

Fig. 10 is a fragmentary detail sectional view taken on the line 10—10 of Fig. 9.

Referring specifically to the drawings, the spreader of my invention, indicated by the numeral 15, is therein shown as mounted on the rear end of a truck 16 in which is transported the material to be spread.

The truck has rear wheels 17, one of which is equipped with a sprocket 18 connected by a drive chain 19 to a sprocket 20 on a shaft 21 which journals in a bearing 22 provided on the truck 16 and transmits rotary motion from the sprocket 18 through a gear box 23 to a vertical shaft 24, the lower end of which journals in a bearing 25 and has fixed thereon a spreading rotor 26. This rotor has two or more blades 27. The bearing 25 is mounted on a frame 28 which is fixed upon the truck 16 and which supports a hopper 29 surrounding the shaft 24 and a transverse backwall 30 which extends transversely of the frame 28 directly behind the rotor 26 so as to prevent any material from being discharged forwardly from this rotor. Also provided on the frame 28 is a rotor floor 35.

Provided on the lower end of the hopper 29 is a flange 36 to which bolts 37 secure a hopper bottom 38 and rings 39, 40, and 41, the latter being spaced by spacers 42 from the rotor floor 35.

The hopper bottom 38 has a series of five material feeding holes 45 which, for identification, will be referred to individually as holes a, b, c, d, and e.

The ring 39 has a somewhat larger inner diameter than the ring 40 to provide an internal annular recess 50 in which a pair of right and left direction valves 51 and 52 are rotatably shiftable. The ring 39 has suitable openings therein (not shown) for accommodating the movement of arms 53 and 54 of these valves when the latter are shifted in the operation of the device. The valve 52 has a ring 55 welded thereto which fits around the rotor shaft 24 and the valve 51 is formed to fit this ring and rotatably bears thereagainst.

The valves 51 and 52 are adapted to be operated by a suitable control mechanism through rods 57 and 58 which connect with the arms 53 and 54 respectively. The valve 51 has a hole 61 and the valve 52 has a hole 62 which are of the same size and spaced the same distance from the axis of the shaft 24 as each of the holes 45 in the hopper bottom 38. The valves 51 and 52 also have small holes 63 and 64, respectively, which are disposed inwardly from the holes 61 and 62 for a purpose which will be disclosed hereinafter.

Rotatably mounted in an annular internal recess 70 formed within the ring 40 and between the ring 41 and the control valves 51 and 52, is a volume control disc 71 having five holes 72 which are of the same size as and spaced from each other and from the axis of the disc 71 the same distances as the holes 45 in the hopper bottom 38. The disc 71 also has smaller holes 73 which are located between the holes 72 and close to the axis of the disc 71. This disc has an arm 74 and is adapted to be manually controlled from the seat of the driver of the truck 16 through a rod 75 connecting to the arm 74. The ring 40 is provided with a suitable opening (not shown) to allow the necessary movement of the arm 74 to permit the disc 71 to be rotated to vary the relation of the holes 72 with the holes 45.

Fixed on the shaft 24 just above the hopper bottom 38 is a collar 80 having arms 81 and 82. There are preferably two arms 81 and two arms 82 with these disposed in alternate relation. As shown in Fig. 10, each arm 81 has a sharp leading edge 83 which acts as a scraper. This edge travels close to the upper surface of the hopper floor 38 and keeps this free of adhering material which might clog the openings 45.

The arms 82, on the other hand, are inclined upwardly so as to force material downwardly and into the openings 45. Thus, a supply of material is always being forced down through the openings 45 and yet this material is not allowed to clog these openings.

Operation

In the operation of the spreader 15, the truck travels in the direction of the arrows 85 in Figs. 3, 5, and 7 and the shaft 24 is thereby caused to rotate preferably at about 450 R. P. M. in the direction of the arrow 86 in Fig. 9.

The truck 16 is provided with a suitable opening in the body thereof through which material is constantly fed to the hopper 29. Besides the mixing arms 81 and 82, the shaft 24 may be provided with other mixing arms 87 for keeping the material stirred up in the hopper 29 to prevent bridges forming in this material.

In Figs. 4, 6, and 8, the hopper bottom 38, valves 51 and 52, and volume control disc 71 are shown in various different relations to vary the scope or area over which material discharged from the rotor 26 is spread. In all of these views, the disc 71 is shown with the holes 72 thereof opposite and in alignment with the holes 45 of the bottom 38. In other words, the disc 71 is shown as positioned in each of Figs. 4, 6, and 8 to give the maximum possible volume of flow of material through the holes 45 to the rotor 26.

It is to be understood of course that this flow may be altered at will by rotation of the disc 71 which moves the holes 72 out of alignment with the holes 45 and thereby decreases the amount of material which can pass through the bottom 38 and disc 71 to the rotor 26.

Control valve 51 is adapted to be placed in either of its two positions in which it is shown in Figs. 4 and 6. In the first of these, it does not obstruct passage of material through any of the holes 45. In the second of these, shown in Fig. 6, it completely shuts off holes $b$ and $c$.

Valve 52 is likewise shiftable between the positions in which it is shown in Figs. 4 and 6. In the first of these it shuts off a flow of material through holes $d$ and $e$ and in the second position, shown in Fig. 6, it does not interfere with the flow of material through any of the holes 45.

For any given setting of the volume control disc 71, it is possible to secure a discharge of the amount of material which will flow through three of the holes 45 practically entirely to the right of the fore-and-aft axis of the spreader 15 as shown in Fig. 3. This is effected as shown in Fig. 4 by the closing of holes $d$ and $c$ by the valve 52 so as to permit material to flow only through holes $a$, $b$, and $c$.

Correspondingly, for any given setting of the control disc 71, it is possible to cause the amount of material which will be delivered through three of the holes 45 to be discharged substantially entirely to the left of the fore-and-aft axis of the spreader 15, as shown in Fig. 5, by positioning the valves 51 and 52 as shown in Fig. 6. Here it is seen that the valve 51 closes holes $b$ and $c$ and the valve 52 is positioned to leave holes $d$ and $e$ open. Hole $a$ remains open at all times. Thus, material is free to flow downwardly through holes $a$, $d$ and $e$ and these are so located with respect to the rotor 26 that this material is discharged to the left side of the spreader as indicated in Fig. 5.

When it is desired that the material fed to the rotor 26 be discharged equally in all directions except forwardly from the rotor 26, as shown in Fig. 7, the valves 51 and 52 are positioned as shown in Fig. 8. Here it will be noted that material is free to pass downwardly through all of the holes 45.

The provision of holes 63 and 64 in the valves 51 and 52 and the holes 73 in the volume control disc 71 are merely for the purpose of keeping the space in the same plane as the valves 51 and 52 clear of material which might otherwise interfere with the free operation of these valves.

I claim:

1. In a spreader the combination of: a hopper; a spreading rotor disposed therebelow; a bottom in said hopper, the latter having a series of holes uniformly spaced about the axis of said rotor; a volume control disc rotatable about said axis and having a like series of holes which are adapted to be related to the holes in said bottom to control the discharge of material through the latter from said hopper; and valve means operable separately from said volume control disc to shut certain of said holes in said hopper bottom at will to prevent the discharge of material from said rotor in certain directions.

2. In a spreader the combination of: a hopper; a spreading rotor disposed therebelow; a bottom in said hopper, the latter having a series of holes uniformly spaced about the axis of said rotor; a volume control disc rotatable about said axis and having a like series of holes which are adapted to be related to the holes in said bottom to control the discharge of material through the latter from said hopper; and a pair of valve members disposed adjacent said hopper bottom and volume control disc and shiftable to open or shut off selected groups of said holes to determine the scope with which material fed to said rotor will be distributed therefrom.

3. In a spreader the combination of: a hopper; a spreading rotor disposed therebelow; a bottom in said hopper, the latter having a series of holes uniformly spaced about the axis of said rotor; a volume control disc rotatable about said axis and having a like series of holes which are adapted to be related to the holes in said bottom to control the discharge of material through the latter from said hopper; and a pair of valve members disposed adjacent said hopper bottom and volume control disc and rotatable individually about the axis of said rotor to open or shut off selected groups of said holes to determine the scope with which material fed to said rotor will be distributed therefrom.

BRUNO E. BALDUF.

REFERENCES CITED

The following references are of record in the file of this patent:

UNITED STATES PATENTS

| Number | Name | Date |
|---|---|---|
| 746,713 | Langston | Dec. 15, 1903 |
| 839,394 | Klein | Dec. 25, 1906 |
| 1,459,915 | Koehmstedt | June 26, 1923 |
| 1,644,031 | Pulliam | Oct. 4, 1927 |
| 1,674,391 | Dunnagan | June 19, 1928 |
| 2,334,376 | Bauer | Nov. 16, 1943 |